(12) United States Patent
Dweib

(10) Patent No.: US 11,572,697 B2
(45) Date of Patent: Feb. 7, 2023

(54) COMPOSITE INSULATED WALL PANEL

(71) Applicant: Saudi Arabian Oil Company, Dhahran (SA)

(72) Inventor: Mahmoud A. Dweib, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 86 days.

(21) Appl. No.: 17/031,503

(22) Filed: Sep. 24, 2020

(65) Prior Publication Data
US 2022/0090386 A1   Mar. 24, 2022

(51) Int. Cl.
E04F 13/08 (2006.01)
B32B 17/02 (2006.01)
E04B 1/90 (2006.01)
E04B 1/94 (2006.01)
E04F 13/16 (2006.01)

(52) U.S. Cl.
CPC .......... E04F 13/0875 (2013.01); B32B 17/02 (2013.01); E04B 1/90 (2013.01); E04B 1/942 (2013.01); E04F 13/16 (2013.01); B32B 2262/067 (2013.01); B32B 2262/101 (2013.01); B32B 2307/102 (2013.01); B32B 2307/304 (2013.01); B32B 2307/3065 (2013.01); B32B 2307/732 (2013.01); B32B 2607/00 (2013.01)

(58) Field of Classification Search
None
See application file for complete search history.

(56) References Cited

U.S. PATENT DOCUMENTS 4,902,215 A    2/1990  Seemann, III
5,080,950 A *  1/1992  Burke .................. B32B 5/24
                                              428/317.1

(Continued)

FOREIGN PATENT DOCUMENTS

EP    2273024    1/2011
JP    4492795    6/2010

OTHER PUBLICATIONS

PCT International Search Report and Written Opinion in International Appln. No. PCT/US2021/051538, dated Dec. 9, 2021, 13 pages.

(Continued)

*Primary Examiner* — Joshua K Ihezie
(74) *Attorney, Agent, or Firm* — Fish & Richardson P.C.

(57) ABSTRACT

A building wall includes an exterior surface and an interior surface. The exterior surface faces the exterior of the building and the interior surface faces an interior room of the building. The wall has a total wall thermal resistance between the exterior surface and the interior surface. The wall includes a structural member positioned between the exterior surface and the interior surface, and the structural member is configured to bear at least a portion of a vertical load of the wall. An insulated composite wall panel is positioned between the structural member and the interior surface. The insulated composite wall panel includes a skin layer including glass fibers and a cellulose fiber insulation board attached with a resin to a first surface of the skin layer. The thermal resistance of the cellulose fiber insulation board comprises the greatest component of the total wall thermal resistance.

6 Claims, 2 Drawing Sheets

(56) References Cited

U.S. PATENT DOCUMENTS

| | | | | |
|---|---|---|---|---|
| 5,334,806 | A * | 8/1994 | Avery | E04B 1/90 181/290 |
| 5,876,835 | A * | 3/1999 | Noble | D21J 3/00 425/84 |
| 6,308,491 | B1 * | 10/2001 | Porter | E04F 13/0875 52/794.1 |
| 6,408,594 | B1 * | 6/2002 | Porter | E04B 7/22 52/270 |
| 6,571,523 | B2 * | 6/2003 | Chambers | E04B 1/14 52/270 |
| 6,698,157 | B1 * | 3/2004 | Porter | E04C 2/296 52/592.1 |
| 7,049,251 | B2 | 5/2006 | Porter | |
| 7,127,856 | B2 * | 10/2006 | Hagen, Jr. | E04B 1/7604 52/407.3 |
| 9,005,396 | B2 | 4/2015 | Baroux | |
| 9,194,120 | B2 | 11/2015 | Pottelbergh et al. | |
| 9,200,458 | B2 | 12/2015 | Harding | |
| 9,481,997 | B2 | 11/2016 | Harding | |
| 9,976,798 | B2 | 5/2018 | Mukherjee et al. | |
| 10,443,232 | B2 | 10/2019 | Heiden | |
| 10,480,181 | B1 | 11/2019 | Norris | |
| 10,544,587 | B2 | 1/2020 | Ibrahim et al. | |
| 10,577,798 | B1 | 3/2020 | Hodgson | |
| 11,225,790 | B1 * | 1/2022 | Lambach | E04C 2/292 |
| 2003/0082361 | A1 | 5/2003 | Jander | |
| 2005/0009428 | A1 * | 1/2005 | Porter | C04B 14/42 442/72 |
| 2005/0055973 | A1 * | 3/2005 | Hagen, Jr. | B29C 44/18 52/741.1 |
| 2006/0068186 | A1 * | 3/2006 | Leclercq | B32B 13/02 428/294.7 |
| 2012/0144765 | A1 * | 6/2012 | LeBlang | E04B 2/58 52/220.2 |
| 2013/0112694 | A1 | 5/2013 | Bentley | |
| 2017/0298639 | A1 * | 10/2017 | Song | B32B 27/32 |

OTHER PUBLICATIONS

Fisette, "Cellulose Insulation—A Smart Choice," Building and Construction Technology, Umass Amherst, Department of Environmental Conservation, 2005, 5 pages.

inspectapedia.com [online], "Table of insulation Material R-Values R-Values of Various," retrieved from URL <https://inspectapedia.com/insulation/Insulation-Values-Table.php>, available on or before Nov. 2019, retrieved on Aug. 21, 2020, 37 pages.

Wool, "Chapter 13: Hurricane-Resistant Houses from Soybean Oil and Natural Fibers," in Bio-Based Polymers and Composites, 2005, 35 pages.

* cited by examiner

COMPOSITE INSULATED WALL PANEL

TECHNICAL FIELD

This disclosure relates to insulated wall panels for building construction.

BACKGROUND

Thermal insulation is a fundamental factor in building construction. Effective thermal insulation for wall construction for residential, commercial, or other purposes can assure a comfortable indoor environment, reduce energy costs, and preserve building structures against mold and other damage.

Cellulose insulation boasts great energy-saving potential. Manufacture of cellulose insulation requires a relatively low amount of energy and may utilize recycled content.

SUMMARY

This disclosure describes technologies relating to a wall panel comprising a cellulose insulating board integrated with a composite skin.

Certain aspects of the subject matter described here can be implemented as a building wall that includes an exterior surface and an interior surface. The exterior surface faces the exterior of the building and the interior surface faces an interior room of the building. The wall has a total wall thermal resistance between the exterior surface and the interior surface. The wall includes a structural member positioned between the exterior surface and the interior surface. The structural member is configured to bear at least a portion of a vertical load of the wall. An insulated composite wall panel is positioned between the structural member and the interior surface. The insulated composite wall panel includes a skin layer including glass fibers and a cellulose fiber insulation board attached with a resin to a first surface of the skin layer. The thermal resistance of the cellulose fiber insulation board comprises the greatest component of the total wall thermal resistance.

An aspect combinable with any of the other aspects can include the following features. A second surface of the skin layer forms the interior surface of the wall.

An aspect combinable with any of the other aspects can include the following features. The insulated composite wall panel is attached to the structural member.

An aspect combinable with any of the other aspects can include the following features. The glass fibers comprise at least 50% by weight of the skin layer.

An aspect combinable with any of the other aspects can include the following features. The skin layer has a tensile strength of at least about 50 MPa.

An aspect combinable with any of the other aspects can include the following features. The skin layer has a modulus of elasticity of at least about 3 GPa.

An aspect combinable with any of the other aspects can include the following features. The skin layer includes a fire-retardant material.

An aspect combinable with any of the other aspects can include the following features. The skin layer has a thickness of between about $\frac{1}{16}$ inch and $\frac{1}{2}$ inch.

An aspect combinable with any of the other aspects can include the following features. The cellulose fiber insulation board includes palm fibers.

An aspect combinable with any of the other aspects can include the following features. The cellulose fiber insulation board has a thermal resistance of at least about 2.5° F.·ft2·h/BTU per inch of thickness of the board.

An aspect combinable with any of the other aspects can include the following features. The cellulose fiber insulation board has a thickness of between about 1 inch and about 6 inches.

Certain aspects of the subject matter described here can be implemented as an insulated composite wall panel. The insulated composite wall panel includes a skin layer comprising glass fibers. The glass fibers comprise at least 50% by weight of the skin layer. The skin layer has a tensile strength of at least about 50 megapascals (MPa) and a modulus of elasticity of at least about 3 gigapascals (GPa). A cellulose fiber insulation board is attached with a resin to a surface of the skin layer.

An aspect combinable with any of the other aspects can include the following features. The skin layer includes a fire-retardant material.

An aspect combinable with any of the other aspects can include the following features. The skin layer has a thickness of between about $\frac{1}{16}$ inch and $\frac{1}{2}$ inch.

An aspect combinable with any of the other aspects can include the following features. The cellulose fiber insulation board includes palm fibers.

An aspect combinable with any of the other aspects can include the following features. The cellulose fiber insulation board has a thermal resistance of at least about 2.5° F.·ft2·h/BTU per inch of thickness.

An aspect combinable with any of the other aspects can include the following features. The cellulose fiber insulation board has a thickness of between about 1 inch and about 6 inches.

Certain aspects of the subject matter described here can be implemented as a method including spreading resin paste onto a surface of a flexible film layer. A layer of chopped glass fibers is deposited onto the resin paste to form a skin layer including the flexible film, resin, and chopped glass fibers. The chopped glass comprises at least about 50% by weight of the skin layer. A cellulose fiber insulation board is laid onto the skin layer to form a composite panel. The composite panel is passed through pressing rollers, and the composite panel is cured with heat to form a cured insulated composite wall panel.

An aspect combinable with any of the other aspects can include the following features. The cellulose fiber insulation board is comprised of palm tree fibers.

An aspect combinable with any of the other aspects can include the following features. The cellulose fiber insulation board has a thermal resistance of at least about 2.5° F.·ft2·h/BTU per inch of thickness.

An aspect combinable with any of the other aspects can include the following features. The cellulose fiber insulation board has a thickness of between about 1 inch and about 6 inches.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

The present disclosure provides an integral panel that provides a strong internal wall surface and, at the same time, insulation against heat and sound suitable to replace traditional wall building construction. Waste materials such as palm leaves are abundantly available and, when dried and crushed, can be a readily-available source of cellulose fibers or particles for insulation purposes. Cellulose insulation boasts great energy-saving potential, high recycled content, and a low amount of energy required to manufacture. Building construction as used herein means both new construction and also renovation or repair of existing buildings.

A wall panel of the present disclosure provides a pre-manufactured integral unit that replaces the insulative layers (and corresponding insulation cavity) of typical construction and also replaces the drywall, and/or other layer(s) of such typical construction.

Figure 1:
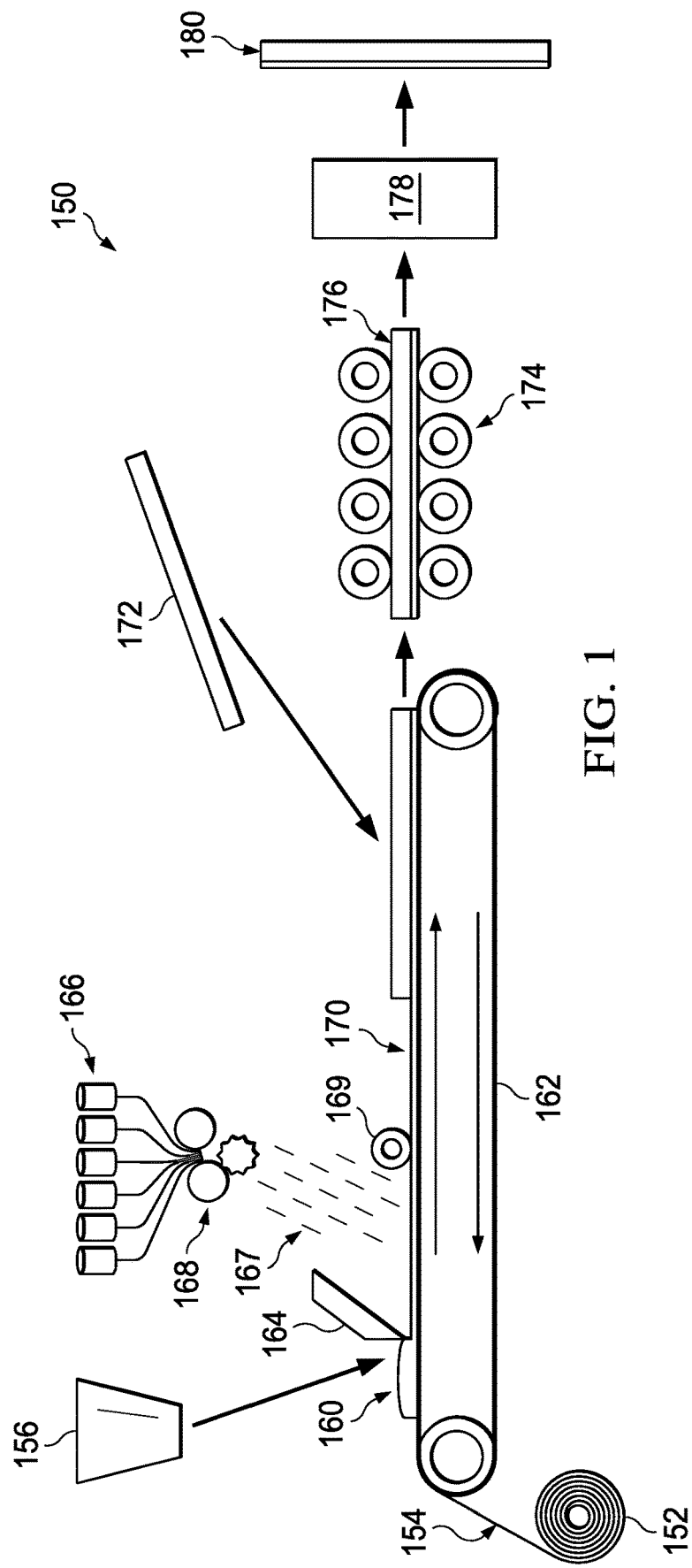
FIG. 1 is a schematic diagram of an example sheet molding compound apparatus for manufacturing a composite insulated wall panel using a sheet molding compound process in accordance with an embodiment of the present disclosure.
Figure 2:
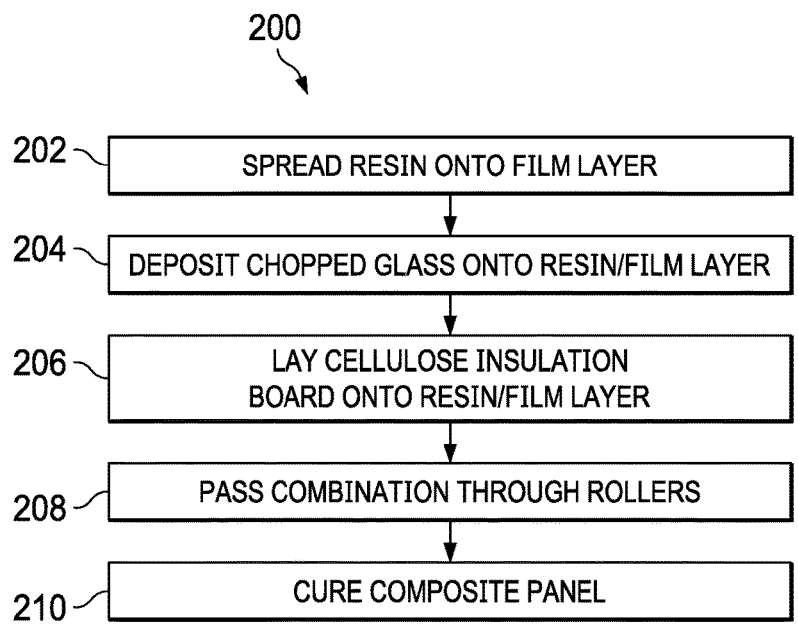
FIG. 2 is a process flow diagram of a method for manufacturing a composite insulated wall panel using a sheet molding compound process in accordance with the embodiment shown in FIG. 1.

FIG. 1 is a schematic diagram of an example sheet molding compound apparatus for manufacturing a composite insulated wall panel using a modified sheet molding compound process in accordance with an embodiment of the present disclosure. FIG. 2 is a process flow diagram of a method 200 for manufacturing a composite insulated wall panel using a modified sheet molding compound process in accordance with the embodiment of the present disclosure shown in FIG. 1. The method 200 of FIG. 2 will be described by reference to the system 150 illustrated schematically in FIG. 1.

The method begins at block 202 of FIG. 2, wherein resin is spread onto a film layer. The film layer can comprise flexible carrier film 154 of system 150 of FIG. 1. Carrier film 154 unrolls from the film roll 152 and is transported across the carrier belt 162. The flexible carrier film 154 may be comprised of nylon or another suitable flexible film material. As carrier film 154 unrolls, liquid resin 160 from reservoir 156 is distributed evenly across the carrier film 154 by the doctor blade 164. In a particular embodiment, resin 160 comprises a thermosetting polyester resin of the type described below in "Examples." In other embodiments, resin 160 may comprise vinyl ester or epoxy resin, or another suitable thermosetting resin.

Continuing to block 204 of FIG. 2, chopped glass fibers 167 are deposited onto the resin that has been spread on the film layer. As shown in FIG. 1, suitable chopped glass fibers 167 may be obtained by chopping glass fiber strands 166 in fiber chopper 168. The chopped glass fibers 167 then fall from gravity onto the resin layer on carrier film 154. The chopped glass fibers 167 are pressed into the resin layer under roller 169, forming composite skin layer 170. Roller 169 may be automated or manually operated. In an embodiment of the disclosure, sufficient chopped glass fibers 167 are applied to the composite skin layer 170 so as to comprise at least about 50% of the weight of composite skin layer 170, with the resin and fire retardant and other additives comprising the remaining weight of skin layer 170. In an embodiment of the present disclosure, composite skin layer has a thickness of about 1/16 inch to about 1/4 inch.

Continuing to block 206 of FIG. 2, a cellulose fiber insulation board (for example, board 172 of FIG. 1) is placed onto the resin on skin layer 170. The placement may be via a manual (by hand) process or via a mechanical or automated process. In some embodiments of the present disclosure, cellulose fiber insulation board 172 may have a thickness of about one inch to about six inches.

In some embodiments, the cellulose fiber insulation board 172 may comprise palm tree cellulose fibers, cellulose fibers from waste plant materials, polymeric binder, boric acid/borax, or other suitable materials, and may be manufactured via a mixing of cellulose fibers with a urea methanol, acrylic binder or other suitable binding material. An example of the manufacture of a suitable cellulose fiber insulation board is described below in the "Examples" section.

Continuing to block 208 of FIG. 2, with the embodiment of the disclosure illustrated schematically in FIG. 1, the combination of the cellulose fiber insulation board 172 with the skin layer 170 is passed through compression rollers 174 to compact the layers together. The gap between the compression rollers can be adjusted at a fixed height based on the thickness of the final product. In an embodiment of the present disclosure, the rollers can be held with pneumatic pistons not exceeding 30 psi to exert enough pressure to impregnate the chop fibers into the resin and consolidate the composite skin to the insulation board without crushing it. At room temperature, composite board 176 begins to cure. Continuing to block 210 of FIG. 2, partially cured composite board 176 is then passed through an elevated temperature chamber 178 set at about 60 degrees Celsius for half an hour to accelerate the already started exothermic room temperature curing process, resulting in an insulated composite wall panel 180. Insulated composite wall panel 180 can then be trimmed as necessary and utilized as a pre-manufactured wall panel.

As described further below in reference to FIGS. 3A-3B, insulated composite wall panel 180 can provide a one-piece insulated panel that provides both an interior surface and also an insulative layer, and thus is suitable to simply and cost-effectively replace the insulation and interior surfaced layers of some typical existing wall construction types.

In accordance with the embodiment of the present disclosure manufactured as described above, skin layer 170 provides a surface with a tensile strength of at least about 50 megapascals (MPa) and a modulus of elasticity of at least about 3 gigapascals (GPa). Thus, skin layer 170 can be suitable for an interior room surface and be strong enough for artwork, a television, and/or other functional or decorative items to be securely attached to it.

Thermal resistance of insulation in the construction industry is commonly expressed as an "R value," and is a measure of how well a barrier layer (such as a layer of insulation, a window or a complete wall or ceiling) resists the conductive flow of heat. Cellulose fiber board 172 is characterized by a thermal resistance (R value) of at least about 2.5° F.·ft$^2$·h/BTU (degrees Fahrenheit square-foot hour per British thermal unit) per inch of thickness. In some embodiments, cellulose fiber insulation board 172 may be from about one inch to about six inches in thickness, thus resulting in a total thermal resistance (R value) for cellulose fiber insulation board 172 of about 2.5° F.·ft$^2$·h/BTU to about 15° F.·ft$^2$·h/BTU.

Within the scope of the present disclosure, insulated composite wall panel 180 may be manufactured in different sizes for different applications. For example, in one embodiment, insulated composite wall panel may have dimensions of 1 to 6 inches thick to suit the level of required insulation in most geographical regions and can be any width and length. In accordance with an embodiment of the present disclosure, a wall panel can be manufactured that is 4 feet wide and 8 or 9 feet long to suit most standard heights of building walls. In other embodiments, this wall panel can be machined to any required (smaller or larger) width and length.

Figure 3A:
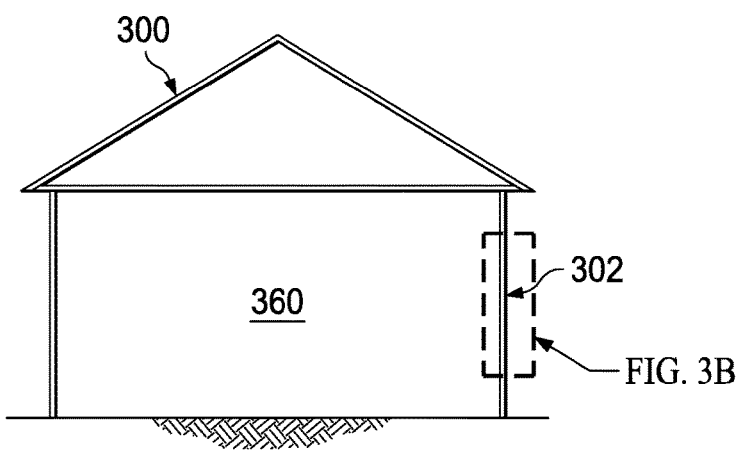
FIGS. 3A-3B are a schematic diagrams of a wall construction using a composite insulated wall panel in accordance with an embodiment of the present disclosure.
Figure 3B:
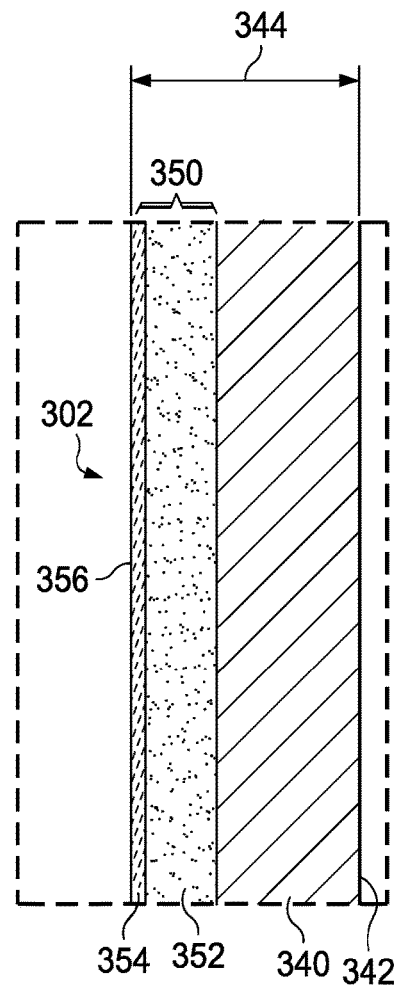

FIGS. 3A and 3B illustrates application of insulated composite wall panel manufactured from processes described in reference to FIGS. 1-2 used to replace a typical insulated building wall construction. For example, in one typical wall construction type, drywall provides an interior surface and can be separated from a structural member (e.g., steel, concrete, brick, or other structural member) by studs. The studs in turn outline insulation cavities into which foam insulation or another insulation material may be inserted. The composite insulated wall panel of the present disclosure can replace the interior surface, insulation cavities, and insulation elements of such traditional construction.

As shown in FIG. 3A, in an embodiment of the present disclosure, building 300 may comprise a residential or commercial building. Wall 302 is a load-bearing wall of building 300 and is shown in more detail in FIG. 3B. Structural member 340 is the load-bearing component of wall 302 and can comprise steel, concrete, stones, brick, wood, or another suitable structural material. Wall panel 350 comprises a pre-manufactured integral composite panel corresponding to wall panel 180 of FIG. 1. Wall panel 350 is an integral panel comprising cellulose board 352 and skin 354 (corresponding in one embodiment to board 172 and skin layer 170 of FIG. 1, respectively). In the illustrated embodiment, wall panel 350 is attached directly to structural member 340. For a wall constructed in an area that exhibits a high moisture level (such as near an indoor pool or in a wet climatic region), a thin polyethylene moisture barrier film (not shown) may be placed between wall panel 350 and structural member 340.

Wall 302 comprises a total thickness 344 between interior surface 356 and exterior surface 342. In some embodiments, a surface of skin 354 comprises interior surface 356 which, in turn, comprises a wall of an interior room 360 of the building. In the illustrated embodiment, no highly insulative layer (such as an insulation cavity filled with loose insulation or a fiberglass roll insulation layer) is present, other than cellulose board 352. Therefore, cellulose board 352 in some embodiments comprises the greatest component of the combined thermal resistance (R value) of wall 302 having thickness 344. The relative importance of the structural member 340 to the combined R value of wall 302 will vary based on the composition and thickness of structural member 340. The thickness of cellulose insulation board 352 may be chosen dependent upon the climate of different geographic regions, so as to provide an appropriate R value for wall 302 for the geographic region in which wall 302 is built.

Skin 354 has sufficient strength for hanging of decorations, framed pictures, wall-mounted televisions, and other decorative or functional items. The surface of skin 354 may be painted, otherwise finished, or may be left unpainted. Wall panel 350 thus serves as both the interior surface component and the main insulative component of wall 302. Panel 350 therefore can provide a pre-manufactured integral unit that replaces the interior surface component and also the insulative layers of other wall construction types.

Examples

Resin Formulation

The following is an example of a resin formulation in accordance with an embodiment of the present disclosure. With every 100 parts of unsaturated polyester resin, mix the following at high speed at room temperature:
- 200-250 parts of alumina trihydrate (ATH) powder (fire retardant agent)
- 15-20 parts of Styrene (improves crosslinking and strength)
- 20-25 parts of Methyl Methacrylate (MMA), improves durability, hardness, and impact resistance
- 5-7 parts of Titanium dioxide (TiO2) improves surface and provides UV resistance
- 0.5-1 part of wetting and dispersing agent (for example, BYK-W 996)
- 0.1-0.2 air release and anti-foaming additive (for example, BYK-A 555)
- 0.0003-0.0005 parts antioxidants and heat stabilizer (for example, Eastman HQMME)

The above recipe provides a resin mixture with a fluid viscosity of between 300 and 450 centipoise and a specific gravity of between 1.5 and 1.8. Just before spreading the resin mixture on the film to make the composite skin, this mixture will be catalyzed with peroxide (MEKP) and cobalt salt in order to cure at room temperature. Amounts to use to catalyze unsaturated polyester are usually recommended by manufacturer based on the available concentration.

Cellulose Fiber Board Construction

The following is an example of a process for manufacturing a cellulose fiber board from palm trees woods in accordance with an embodiment of the present disclosure:
a. Palm wood components from leaves shavings and logs are collected and brought to the mill.
b. Palm wood components are cut and chipped to small pieces (about 1 inch in size) and washed to remove dirt and sand and cleaned from any other objects such as metal pieces. Steam digesters and steaming screws are typically used for conditioning wood raw material (softening the lignin).
c. Pulp fiber is then separated from lignin binder by shearing the wood between two rotating metal disks (mechanical pulping).
d. Pulp fiber is then washed to remove wood sugars, dirt, and other foreign material that may exist.
e. Pulp fiber is then entered into a blow line pipe (diameter may reach 1 meter based on the quantities processed), paraffin wax is injected (about 1% of the fiber solid weight) to coat fiber to improve moisture absorption resistance.
f. Polymer binder of urea formaldehyde (urea methanol) or acrylic binder of about 5-10% of the solid weight of the fibers is then added to the pulp fiber in the blow line.
g. Fire retardant of boric acid or borax of about 5-8% of the dry weight is added. Can be premixed with binder or injected into the blow line.
h. The pulp fiber is then dried in the heated blow line into fine fluffy fibers ready for use into mats, boards or storage.
i. The fiber is then made into fiber boards using hot press or compression molding to produce the desired boards dimensions and required density.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" or "substantially" mean a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A building wall comprising:
   an exterior surface and an interior surface, the exterior surface facing an exterior of the building and the interior surface facing an interior room of the building, the wall having a total wall thermal resistance between the exterior surface and the interior surface;
   a structural member positioned between the exterior surface and the interior surface, the structural member configured to bear at least a portion of a vertical load of the wall; and
   an integral, sheet-molded composite panel unit attached to the structural member, the sheet-molded composite panel unit comprising:
     a skin layer comprising chopped glass fibers pressed into a resin layer spread onto a flexible carrier film, wherein the chopped glass fibers comprise at least 50% by weight of the skin layer and the skin layer has a tensile strength of at least 50 MPa; and
     a cellulose fiber insulation board attached with the resin layer to a first surface of the skin layer, the cellulose fiber insulation board having a thermal resistance of at least 2.5° F.·ft$^2$·h/BTU per inch of thickness of the board;
   wherein the thermal resistance of the cellulose fiber insulation board comprises the greatest component of the total wall thermal resistance and wherein a second surface of the skin layer of the sheet-molded composite panel unit forms the interior surface of the wall.

2. The wall of claim 1, wherein the skin layer has a modulus of elasticity of at least 3 GPa.

3. The wall of claim 1, wherein the skin layer further comprises a fire-retardant material.

4. The wall of claim 1, wherein the skin layer has a thickness of between 1/16 inch and 1/2 inch.

5. The wall of claim 1, wherein the cellulose fiber insulation board comprises palm fibers.

6. The wall of claim 2, wherein the cellulose fiber insulation board has a thickness of between about 1 inch and about 6 inches.

* * * * *

UNITED STATES PATENT AND TRADEMARK OFFICE
CERTIFICATE OF CORRECTION

PATENT NO.        : 11,572,697 B2
APPLICATION NO.   : 17/031503
DATED             : February 7, 2023
INVENTOR(S)       : Mahmoud A. Dweib It is certified that error appears in the above-identified patent and that said Letters Patent is hereby corrected as shown below:

In the Claims

Column 8, Claim 6, Line 46, delete "claim 2," and insert -- claim 1, --

Column 8, Claim 6, Line 47, after "between" delete "about".

Column 8, Claim 6, Line 48, before "6" delete "about".

Signed and Sealed this
Twenty-eighth Day of March, 2023

*Katherine Kelly Vidal*

Katherine Kelly Vidal
*Director of the United States Patent and Trademark Office*